(12) United States Patent
De Carvalho et al.

(10) Patent No.: US 11,152,988 B2
(45) Date of Patent: Oct. 19, 2021

(54) TECHNIQUES FOR BEAMFORMING IN MULTI-USER SYSTEMS

(71) Applicant: APPLE INC., Cupertino, CA (US)

(72) Inventors: Elisabeth De Carvalho, Norresundby (DK); Carles Navarro Manchon, Aalborg (DK)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/769,729

(22) PCT Filed: Oct. 8, 2018

(86) PCT No.: PCT/US2018/054809
§ 371 (c)(1),
(2) Date: Jun. 4, 2020

(87) PCT Pub. No.: WO2019/112688
PCT Pub. Date: Jun. 13, 2019

(65) Prior Publication Data
US 2020/0389214 A1    Dec. 10, 2020

(30) Foreign Application Priority Data
Dec. 4, 2017    (EP) .................................... 17205202

(51) Int. Cl.
*H04B 7/02* (2018.01)
*H04B 7/06* (2006.01)
(Continued)

(52) U.S. Cl.
CPC .......... *H04B 7/0617* (2013.01); *H04B 7/046* (2013.01); *H04B 7/0452* (2013.01);
(Continued)

(58) Field of Classification Search
CPC .. H04B 7/0617; H04B 17/104; H04B 17/309; H04B 7/0452; H04B 7/046; H04B 7/0686
(Continued)

(56) References Cited

U.S. PATENT DOCUMENTS

2008/0130790 A1    6/2008  Forenza et al.
2011/0273977 A1*  11/2011  Shapira ................ H04B 7/0617
                                                    370/208

(Continued)

FOREIGN PATENT DOCUMENTS

WO    2017/184043 A1    10/2017
WO    2017/197189 A1    11/2017

OTHER PUBLICATIONS

International Search Report dated Dec. 17, 2018 for International Application No. PCT/US2018/054809.

*Primary Examiner* — Zewdu A Kassa
(74) *Attorney, Agent, or Firm* — Eschweiler & Potashnik, LLC (57) ABSTRACT

The disclosure relates to techniques for beamforming in multi-user systems. The disclosure particularly relates to a base station for communication with multiple user terminals, the base station comprising: a digital precoder and an analog precoder which are configured to precode a first training signal; a radio transceiver configured to transmit the precoded first training signal and to receive a precoded second training signal upon transmission of the precoded first training signal; and a controller configured to adjust a precoding of the digital precoder based on processing of the second training signal with respect to a normalization criterion and to adjust a precoding of the analog precoder based on processing of the second training signal with respect to a multi-user beamforming criterion.

17 Claims, 7 Drawing Sheets

(51) Int. Cl.
  *H04B 17/10*    (2015.01)
  *H04B 17/309*   (2015.01)
  *H04B 7/0452*   (2017.01)
  *H04B 7/0456*   (2017.01)

(52) U.S. Cl.
  CPC ......... *H04B 7/0686* (2013.01); *H04B 17/104* (2015.01); *H04B 17/309* (2015.01)

(58) Field of Classification Search
  USPC ................ 375/267, 260, 259, 316, 295, 219
  See application file for complete search history.

(56) References Cited

U.S. PATENT DOCUMENTS

| | | |
|---|---|---|
| 2013/0057432 A1 | 3/2013 | Rajagopal et al. |
| 2014/0307654 A1 | 10/2014 | Kim |
| 2015/0244418 A1* | 8/2015 | Verbin ................ H04B 3/32 |
| | | 370/201 |
| 2015/0365143 A1 | 12/2015 | Chai et al. |
| 2016/0080051 A1 | 3/2016 | Sajadieh et al. |
| 2016/0119910 A1 | 4/2016 | Krymien et al. |
| 2019/0190574 A1* | 6/2019 | Chen ................ H04B 7/0617 |
| 2019/0288760 A1* | 9/2019 | Li ........................ H04B 17/11 |

* cited by examiner

TECHNIQUES FOR BEAMFORMING IN MULTI-USER SYSTEMS

This application is a National Phase entry application of International Patent Application No. PCT/US2018/054809 filed on Oct. 8, 2018, which claims priority to European Patent Application No. 17205202.9 filed on Dec. 4, 2017 and is hereby incorporated by reference in their entirety.

FIELD

The disclosure relates to techniques for beamforming in multi-user systems. The disclosure particularly relates to a base station for serving multiple user terminals, a corresponding user terminal and a multi-user precoding method. The disclosure further relates to a ping-pong beam training method for multi-user MIMO systems with hybrid digital-analog antenna arrays.

BACKGROUND

Beamforming between MIMO (multiple-input multiple-output) wireless transceivers enables SNR (signal-to-noise ratio) gains for single-stream transmission that are proportional to the number of antennas used. The basic principle is to linearly pre-code the transmitted signal in such a way that it can be coherently combined at the receive antenna array. In a multi-terminal or user system, spectral efficiency is generally optimized when the access point communicates with multiple terminals simultaneously exploiting the spatial degrees of freedom provided by the presence of multiple antennas at both the transmitter and the receiver. The design of multi-terminal transceivers (especially in the downlink direction) conventionally requires the whole set of multi-terminal channel coefficients, which is a costly operation, potentially bringing non sustainable delays in the communication. The disclosure presents techniques for efficient communication in multi-terminal or user beamforming systems.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
BF: Beamforming
MIMO: Multiple-Input Multiple-Output
MU-MIMO: Multi-User MIMO
CSI: Channel State Information
SNR: Signal-to-Noise Ratio
SVD: Singular Value Decomposition
BS: Base Station
ZF: Zero Forcing
RF: Radio Frequency
BB: Baseband It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as LTE, in particular LTE-A and/or OFDM and successor standards such as 5G. The methods are also applicable for high speed communication standards from the 802.11 family according to the WiFi alliance, e.g. 802.11ad and successor standards. The methods and devices described below may be implemented in electronic devices such as access points and base stations or cellular handsets and mobile or wireless devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 1:
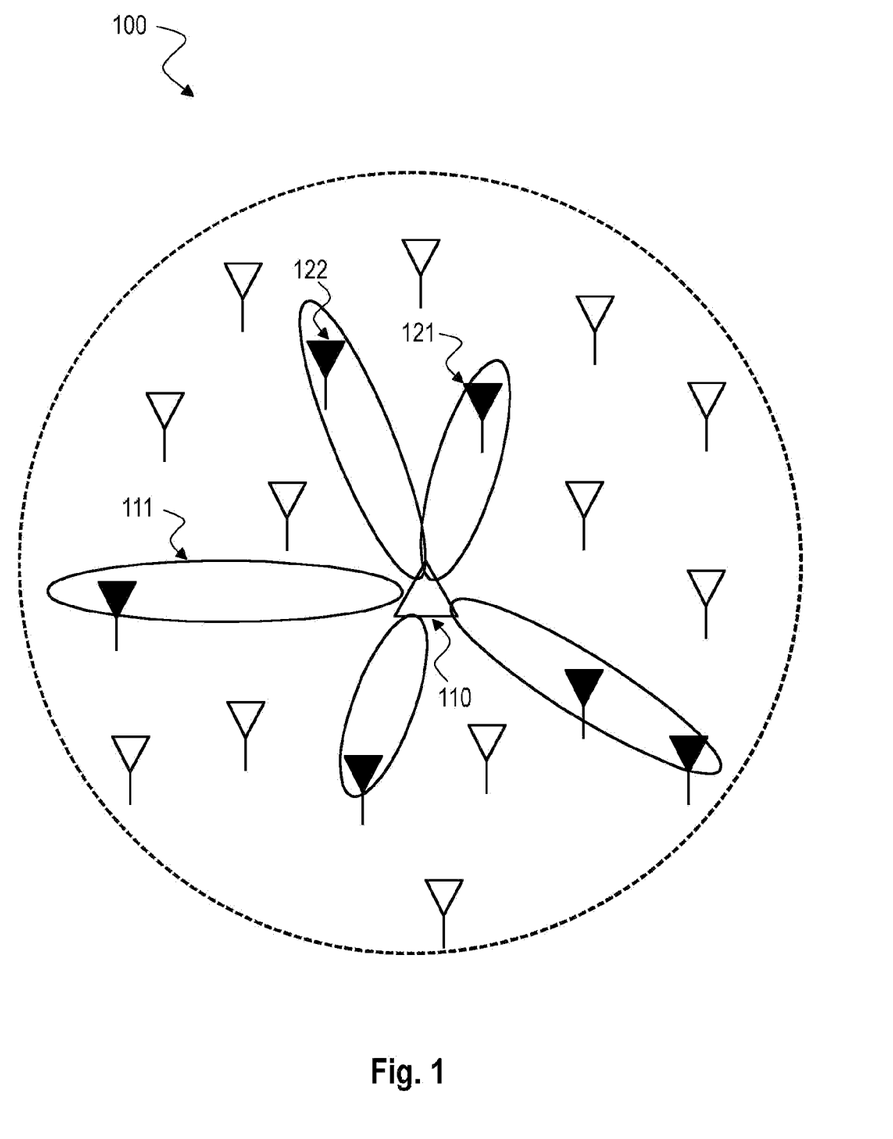
FIG. 1 is an exemplary schematic diagram illustrating a multi-terminal beamforming system 100.

FIG. 1 is a schematic diagram illustrating a multi-terminal beamforming system 100. The beamforming system 100 includes a radio cell in which a base station or access point 110 provides beamformed communication 111 to multiple terminals 121, 122.

Beamforming between MIMO wireless transceivers (of base station or access point 110 and user terminals 121, 122 as shown in FIG. 1) enables SNR gains for single-stream transmission that are proportional to the number of antennas used. In a nutshell, the basic principle is to linearly pre-code the transmitted signal in such a way that it can be coherently combined at the receive antenna array. The SNR gain obtained this way is maximum when the pre-coder and combiner are calculated based on the singular vectors of the MIMO channel matrix associated to its largest singular value. Hence, optimal beamforming requires full channel state information (CSI) and computationally demanding singular value decomposition (SVD) of the channel matrix. To avoid the need for acquisition of the CSI and the subsequent SVD, ping-pong beam training methods can be applied, in which the MIMO transceivers perform alternate transmissions of training data while setting their pre-coders via simple conjugation and normalization operations. Due to the wireless channel reciprocity, this strategy implicitly implements a power iteration method that leads to the pre-coders at both transceivers converging to the left and right singular vectors of the channel, hence approaching the optimal beamforming gain.

The cost and power consumption of antenna arrays grows with the number of elements and the bandwidth and carrier frequency of the system, making digitally controlled antenna arrays infeasible for millimeter Wave (mmWave) frequency systems. Hybrid digital-analog antenna arrays, in which the array is steered using analog phase shifters and only a few digitally modulated radio-frequency chains, can reduce this cost. However, the presence of the analog phase shifters prevents the use of SVD-based beamforming solutions, as full CSI acquisition becomes infeasible and direct applicability of ping-pong beam training methods. Instead, methods for selecting the pre-coders based on a search over a hierarchical codebook can be applied, with or without partial CSI acquisition, e.g. angles of arrival/departure of multipath components.

In a multi-terminal system as shown for example in FIG. 1, spectral efficiency is generally optimized when the access point 110 communicates with multiple terminals 121, 122 simultaneously exploiting the spatial degrees of freedom provided by the presence of multiple antennas at both the transmitter and the receiver. The design of multi-terminal transceivers (especially in the downlink direction) conventionally requires the whole set of multi-terminal channel coefficients, which is a costly operation, potentially bringing non sustainable delays in the communication. Instead, it is more efficient to estimate the left and right singular vectors of each terminal 121, 122 in a training procedure and build multi-terminal transceivers that are based on this limited CSI. One specificity is that the analog beamformers at the access point 110 are common to all terminals 121, 122, necessitating a joint design of the multi-terminal training procedure.

The disclosure addresses the problem of estimating the left and right singular vectors in a multi-terminal system, e.g. as shown in FIG. 1, where all the devices 110, 121, 122 are equipped with hybrid digital-analog antenna arrays. In particular, the disclosure addresses a multi-user system 100, e.g. as shown in FIG. 1, in which the base station 110 and the multiple users 121, 122 are equipped with hybrid digital-analog antenna arrays. The disclosure particularly addresses downlink communication of a base station 110 with multiple users (i.e. user terminals 121, 122) which are served over the same channel resources, multiplexed in the spatial dimension (i.e. a multi-user MIMO (MU-MIMO) system). The disclosed method yields a close-to-optimal hybrid (analog and digital) precoder for MU-MIMO systems. The multiple users may share the same analog beam. The procedure relies on ping-pong transmission and the method to update both the analog and the digital beams is described in the following, in particular below with respect to FIGS. 2 and 3.

The disclosure presents a novel ping-pong beam training method in a multi-terminal system that circumvents the limitations due to the hybrid structure of the antenna array. The presented method is based on alternate transmissions of training data between the access points 110 and the multiple terminal 121, 122 all with hybrid antenna arrays.

The method distinguishes between uplink and downlink transmission. Based on uplink training, the access point 110 updates the digital and analog pre-coders that are subsequently used to transmit the downlink training with a two-step procedure: 1) the digital pre-coder used for transmission to each terminal 121, 122 is set following the conjugation and normalization operations as described below with respect to FIGS. 2 and 3 in more detail; 2) the analog pre-coders are computed by selecting elements of a hierarchical codebook according to a multi-user criterion. As the analog beamformers are common to all the terminals, the resulting multi-terminal beam steering finds a compromise among the directions of departure of the channel's most significant multipath components of the different terminals.

Based on downlink training, one given terminal, e.g. terminal 121 shown in FIG. 1 updates the digital and analog pre-coders that are subsequently used to transmit the uplink training with a two-step procedure: 1) the digital pre-coder used for transmission from each terminal 121, 122 is set following the conjugation and normalization operations as described below with respect to FIGS. 2 and 3 in more detail; 2) the analog pre-coders are computed by selecting elements of a hierarchical codebook that steer the transmitted signal towards the directions of departure of the channel's most significant multipath components.

The resulting scheme has very low complexity, as it avoids the need for full CSI acquisition, and converges with only a few back-and-forth transmissions. Performance-wise, the disclosed beam training method achieves higher beamforming gain than the original scheme devised for digital arrays at low SNR ranges, while performing very closely to the optimal SVD-based beamformers at the high SNR regime as illustrated below with respect to FIG. 4.

The computational complexity of the method is negligible compared to other receiver operations and compared to alternative beamforming methods. The digital beamformers/combiners are computed by conjugating the digital signal received in the previous transmission and normalizing the resulting vector to fulfill a power constraint. The analog precoders/combiners are chosen from a predefined codebook which is designed offline. The search in the codebook is performed by simply sorting in descending order of magnitude the entries of a normalized version of the received signal vector.

The method can be used to enhance both the terminal and the cell throughput in systems equipped with hybrid antenna arrays, e.g. 5G systems operating above 6 GHz, for which 3GPP mandates the usage of cooperative beam management procedures.

Figure 2:
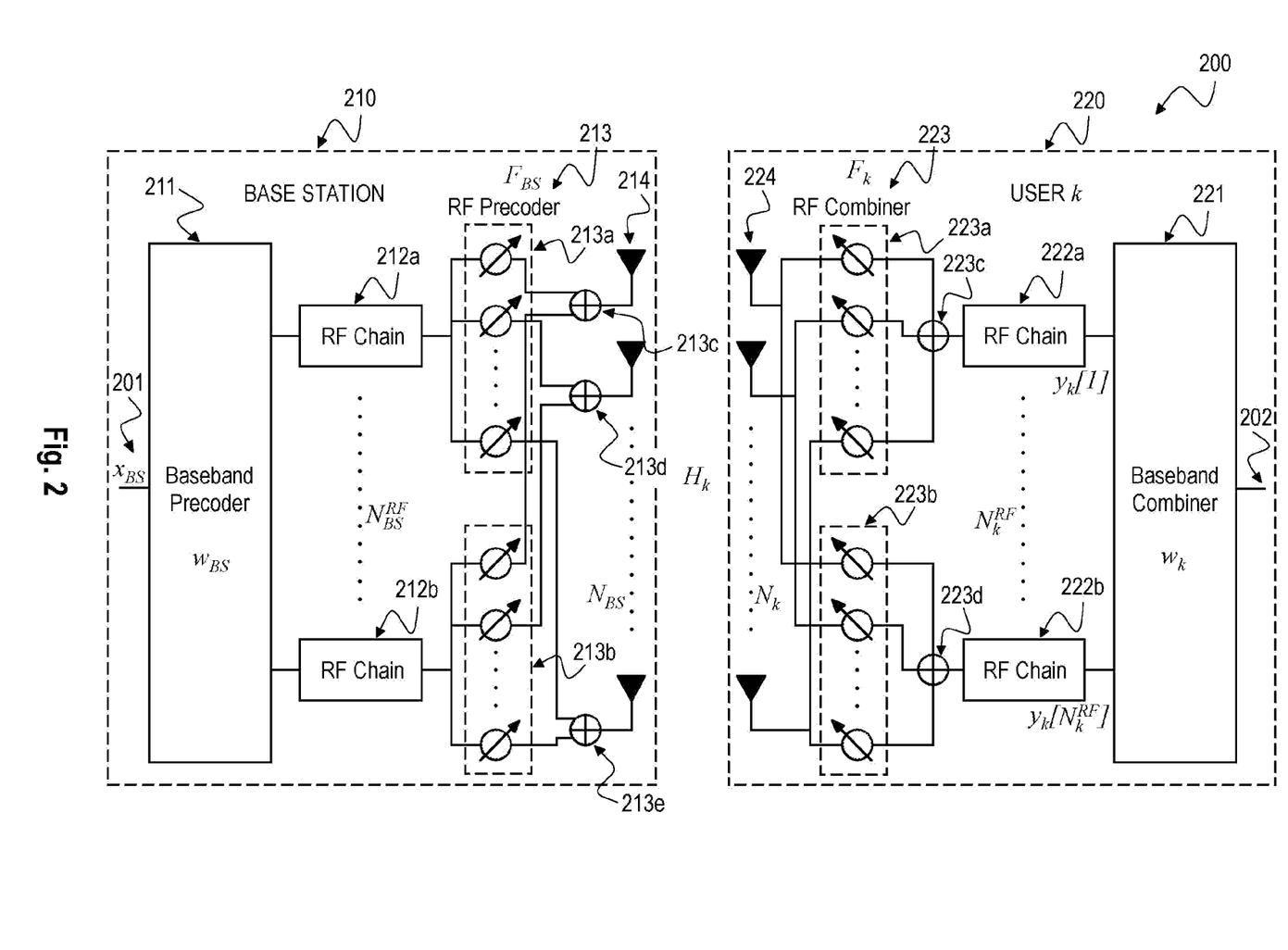
FIG. 2 is a block diagram illustrating an exemplary multi-user beamforming system 200 according to the disclosure.

FIG. 2 is a block diagram illustrating a multi-user beamforming system 200 according to the disclosure. The left side block of FIG. 2 represents the base station 210 while the right side block of FIG. 2 represents the multi-user terminals 220 exemplary depicting the terminal of user k.

In the base station 210 a transmit signal 201 can pass the baseband precoder 211, a plurality of RF chains 212a, 212b and an RF precoder 213 before being transmitted by an antenna array 214 over a MIMO channel $H_k$. Each RF chain is coupled to a respective RF precoder group 213a, 213b which can perform together with combination logics 213c, 213d, 213e the respective beamforming of the transmit signal 201.

In the user terminal 220 the transmit signal can be received via an antenna array 224 which is coupled to an RF combiner 223 for combining the RF signals received by the antenna array 224. The RF combiner 223 is partitioned in groups of RF beamformers 223a, 223b with respective combiners 223c, 223d for generating the RF signals for a respective plurality of RF chains 222a, 222b. Digital output signals of the RF chains 222a, 222b can be combined in baseband by a baseband combiner 221 to provide an estimate 202 of the transmit signal 201.

FIG. 2 exemplarily depicts a system with one BS 210 and multiple terminals 220, equipped with uniform linear arrays 214, 224 with $N_{BS}$ and $N_k$ elements at terminal k, 220 separated by a distance $d=\lambda/2$, each having $N_{BS}^{RF}$ and $N_k^{RF}$ RF chains 212a, 212b, 222a, 222b, and with $\lambda$ denoting the wavelength.

Figure 3:
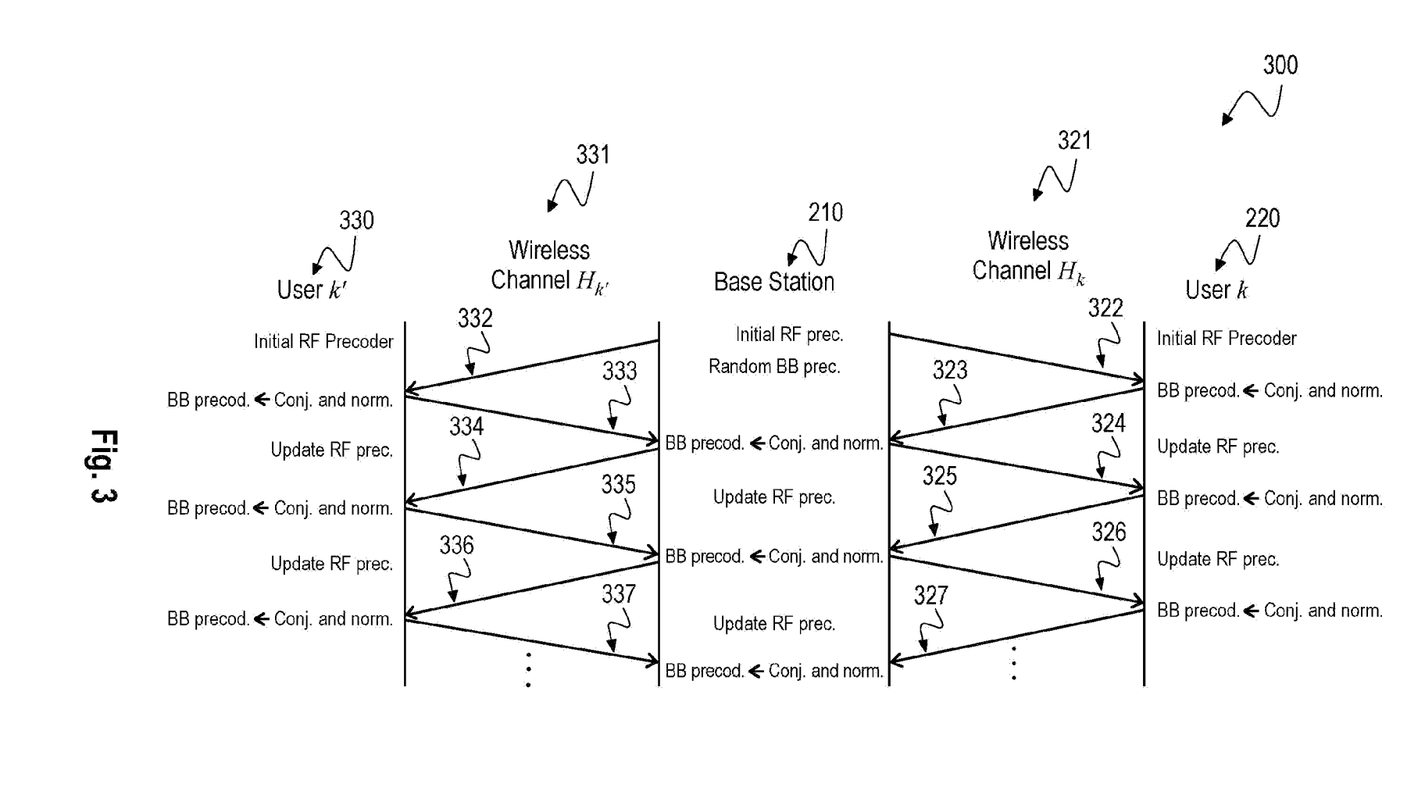
FIG. 3 is a schematic diagram illustrating a ping-pong beam training method 300 according to the disclosure in a multi-user system.

The method is based on a sequence of alternate transmissions of training sequences between the BS 210 and the terminals 220, 330, as illustrated in FIG. 3. A training procedure can be performed for each access point-terminal link based on a pilot sequence. The pilot sequences are assumed to be mutually orthogonal so that the training signals of each terminal can be easily separated (based on a correlation with the appropriate pilot sequence).

In the downlink direction, the BS 210 can perform simultaneous transmissions to all K users 220 using orthogonal training sequences. After correlating with the pilot sequence, the signal received at the kth terminal 220 reads $$y_k = F_k^T H_k F_{BS} w_{BS,k} + F_k^T n_k.$$

This signal is conjugated and normalized to be used as the baseband precoder for user k ($w_k$) for the uplink transmission. After the downlink transmission, the BS 210 updates its RF precoder 213 as indicated further below. Upon reception of the downlink training sequence, all K users 220 can simultaneously transmit their orthogonal training sequences using their updated baseband precoders. After this uplink transmission, the users 220 can update their RF precoders as indicated further below.

To perform the training procedure for terminal k 220, the received signal at the BS 210 is correlated by the pilot sequence of terminal k 220. After proper scaling, the received signal is $$y_{BS,k} = F_{BS}^T H_k^T F_k w_k + F_{BS}^T n_{BS,k}$$

which, after conjugation and normalization, is used to update the baseband precoder 213 used by the BS 210 for user k ($w_{BS,k}$).

In the equations above, $F_{BS}$ and $w_{BS,k}$ denote the RF precoder 213 at the BS 210 (common to all terminals 220) and baseband (BB) precoders 211 at the BS 210. $F_k$ and $w_k$ denote the RF precoder 223 and baseband (BB) precoders 221 at terminal k 220, with $n_{BS,k}$ and $n_k$ representing AWGN vectors at the BS 210 and at terminal k 220 (it is the equivalent noise after normalized correlation). While the BB precoders 211, 221 can take any values in the complex domain ($w_{BS,k} \in \mathbb{C}^{N_{BS}^{RF}}$, $w_k \in \mathbb{C}^{N_k^{RF}}$), the entries of $F_{BS}$ and $F_k$ can only take complex values with unit magnitude or zero, as they implement phase shifting operations. In addition, the effective precoders are forced to fulfill the normalization constraint $\Sigma_{k=1}^K \|F_{BS} w_{BS,k}\|^2 = \|F_k w_k\|^2 = 1$.

FIG. 3 is a schematic diagram illustrating a ping-pong beam training method 300 according to the disclosure in a multi-user system.

FIG. 3 illustrates a method between a base station 210 as described above with respect to FIG. 2 and an exemplary number of two users terminals, e.g. a user terminal k 220 as described above with respect to FIG. 2 and another user terminal k' 330. In the method multiple transmissions between the base station 210 and the user terminals 220, 330 are performed in a ping pong fashion. After each transmission the base station 210 and the user terminals 220, 330 update their BB precoders 211, 221 and RF precoders 213, 223. For example, between base station 210 and user terminal k 220 the exemplary transmissions 322, 323, 324, 325, 326, 327 are performed in a ping-pong manner. For example, between base station 210 and user terminal k' 330 the exemplary transmissions 332, 333, 334, 335, 336, 337 are performed in a ping-pong manner.

As detailed in FIG. 3, the RF precoders 213, 223 of the BS 210 and of all users 220 are initialized to a state in which they scan all directions, and the BB precoder 211 of the first device to transmit (the BS 210 in the figure) is initialized randomly. After this, the alternate transmission of training sequences starts. After each reception and normalized correlation with the pilot sequence of terminal k 220, the transceiver performs complex conjugation of the resulting signal. The resulting vector is, after normalization, set to be the new BB precoder, which is immediately used to transmit a new pilot to the other device. Immediately after, the device updates its RF precoder using the information obtained at the latest reception, so that the updated RF precoder can be used in for the coming reception.

The characteristic of this procedure is the update of the RF precoders in a multi-terminal communication with the specificity that there are no distinct RF precoders to communicate to one given terminal but rather RF precoders that are used in common. The columns of the RF precoders $F_{BS}$ and $F_k$ are restricted to belong to a hierarchical, directional codebook. In the following, an example of implementation of the method is described with an example codebook. Note that other codebooks following similar structure can be used as well.

In the Example of implementation the codebook definition is illustrated for transceiver BS, and an analogous codebook is used for the transceiver of terminal k. A codebook $C_{BS}$ is considered which is composed of $$L_{BS} = \log_2 \frac{N_{BS}}{N_{BS}^{RF}} + 1$$

levels. For the jth level, a subcodebook $C_{BS}^{(j)} = \{\varphi_{BS,i}^{(j)}, i=0, 1, \ldots, M_{BS}^{(j)} - 1\}$ is defined consisting of $M_{BS}^{(j)} = N_{BS}^{RF} 2^{j-1}$ column vectors, $j = 1, 2, \ldots, L_A$. Each of the elements of the subcodebook is defined as $$\varphi_{BS,i}^{(j)} = \left[ 1, e^{-j\psi_{BS,i}^{(j)}}, e^{-j2\psi_{BS,i}^{(j)}}, \ldots, e^{-j(M_{BS}^{(j)}-1)\psi_{BS,i}^{(j)}}, 0_{N_{BS}-M_{BS}^{(j)}}^T \right]^T$$

where $\Psi_{BS,i}^{(j)} = \pi - \pi(2i+1)/M_{BS}^{(j)}$ is the directional cosine of the ith vector at the jth level, and $0_N$ is an N-dimensional column vector with zero entries. Basically $\varphi_{BS,i}^{(j)}$ steers the array in the direction $\theta_{BS,i}^{(j)} = \cos^{-1} \Psi\theta_{BS,i}^{(j)}$, with a lobe whose width decreases with the codebook level j (more array elements are used for higher-level codebook elements, resulting in more directive patterns).

Using the codebook defined above, a particular instance of the disclosed method can be described in Algorithm 1 shown below.

---

Algorithm 1 Multi-User Ping-Pong Beam Training with Hybrid Arrays

1:   Initialize: $F_{BS}^{[0]} \leftarrow [\varphi_{BS,0}^{(1)}, \varphi_{BS,1}^{(1)}, \ldots, \varphi_{BS,M^{(1)BS(1)}-1}]$.
     $F_k^{[0]} \leftarrow [\varphi_{k,0}^{(1)}, \varphi_{k,1}^{(1)}, \ldots, \varphi_{k,M^{(1)k(1)}-1}]$, $a_k \sim \mathcal{CN}(0_{N_{BSRF}}, I)$,      $w_{BS,k}^{[0]} \leftarrow \frac{1}{\sqrt{K}} \frac{a_k}{\|F_{BS}^{[0]} a_k\|_2}$,      $k = 1, 2, \ldots, K$. $W_{BS}^{[0]} \leftarrow [w_{BS,1}^{[0]} w_{BS,2}^{[0]} \ldots w_{BS,K}^{[0]}]$ 2:   BS transmits with effective precoder $F_{BS}^{[0]} W_{BS}^{[0]}$.
3:   for $k = 1, 2, \ldots, K$ do
4:     User k receives $y_k^{[0]} = (F_k^{[0]})^T H_k F_{BS}^{[0]} w_{BS}^{[0]} + (F_k^{[0]})^T n_k^{[0]}$.
5:     $w_k^{[0]} \leftarrow (y_k^{[0]})$.

6:     $w_k^{[0]} \leftarrow \frac{w_k^{[0]}}{\|F_k^{[0]} w_k^{[0]}\|_2}$ 7:   end for
8:   $t \leftarrow 1$
9:   loop
10:    for $k = 1, 2, \ldots, K$ do
11:     User k transmits with effective precoder $F_k^{[t-1]} w_k^{[t-1]}$.
12:     $F_k^{[t]} \leftarrow U_{PD} \cdot \text{UE A}_{NALOG} \cdot P_{RECODER}(F_k^{[t-1]}, w_k^{[t-1]}, C_k)$
13:     BS receives $y_{BS,K}^{[t]} = (F_{BS}^{[t-1]})^T H_k^T F_k^{[t-1]} w_k^{[t-1]} + (F_{BS}^{[t-1]})^T n_{BS}^{[t]}$
14:     $w_{BS,k}^{[t]} \leftarrow (y_{BS,k}^{[t]})^+$ 15:     $w_{BS,k}^{[t]} \leftarrow \frac{1}{\sqrt{K}} \frac{w_{BS,k}^{[t]}}{\|F_{BS}^{[t-1]} w_{BS,k}^{[t]}\|_2}$ 16:    end for
17:    $W_{BS,k}^{[t]} \leftarrow [w_{BS,1}^{[t]} w_{BS,2}^{[t]} \ldots w_{BS,K}^{[t]}]$
18:    BS transmits with effective precoder $F_{BS}^{[t-1]} W_{BS}^{[t]}$.
19:    $F_{BS}^{[t]} \leftarrow U_{PD} \cdot \text{BS A}_{NALOG} \cdot P_{RECODER}(F_{BS}^{[t-1]} \cdot w_{BS}^{[t]} \cdot C_{BS})$
20:    for $k = 1, 2, \ldots, K$ do
21:     User k receives $y_K^{[t]} = (F_k^{[t]})^T H_k F_{BS}^{[t-1]} w_{BS}^{[t]} + (F_k^{[t]})^T n_k^{[t]}$.
22:     $w_k^{[t]} \leftarrow (y_k^{[t]})^+$ 23:     $w_k^{[t]} \leftarrow \frac{w_k^{[t]}}{\|F_k^{[t]} w_k^{[t]}\|_2}$ 24:    end for
25:    $t \leftarrow t + 1$
26:   end loop

---

The RF precoders for both devices are initialized by using the elements in the lowest level of the codebook (j=1), and a random BB precoder is selected for each of the K users at the BS (without loss of generality, the training procedure is initialized at the BS). Then, the sequence of alternate pilot transmissions starts. The BB precoders are updated by conjugation and normalization operations (lines 5-6, 14-15, and 22-23 in Algorithm 1), while two columns of the RF precoder are updated each time the routines in Algorithm 2 shown below are invoked. The RF precoders at the BS are updated according to a criterion that is different from the one used to update the RF precoders at the terminal side.

---

Algorithm 2 Analog Precoder Update Functions

1:   function UPD. UE ANALOG PRECODER(F, w, C)
2:    generate $k_n, i_n, n = 1, \ldots, N^{RF}$ 3:    $v_n \leftarrow |w_n| / \sqrt{M(k_n)}$,      $n = 1, \ldots, N^{RF}$ 4:    $n_{max} \leftarrow \arg\max_n\{v_n : k_n < L\}$ -continued Algorithm 2 Analog Precoder Update Functions 5:    $n_{min} \leftarrow \arg\min_n\{v_n : n = 1, \ldots, N^{RF}\}$
6:    if $n_{max} \neq n_{min}$ then
7:     remove $n_{max}$th, $n_{min}$th columns of F 8:     add new columns $\varphi_{,2i_{n_{max}}}^{(k_{n_{max}}+1)}, \varphi_{,2i_{n_{max}}+1}^{(k_{n_{max}}+1)}$       to F 9:    end if
10:    return F
11:  end function
12:  function UPD. BS ANALOG PRECODER(F, w, C)

-continued

Algorithm 2 Analog Precoder Update Functions

13:     select $n_{max}$, $n_{min}$ using selection criterion
14:     if $n_{max} \neq n_{min}$ then
15:         remove $n_{max}$th, $n_{min}$th columns of F
16:         add new columns $\varphi_{2i_{n_{max}}}^{(k_{n_{max}}+1)}$, $\varphi_{2i_{n_{max}}+1}^{(k_{n_{max}}+1)}$ to F
17:     end if
18:     return F
19: end function The BS RF precoder update is described in the routine UPD. BS ANALOG PRECODER in Algorithm 2 requires further explanation. First, the columns of the RF precoder are sorted according to a specific sorting criterion. After this, two columns are selected: $n_{max}$ denotes the best column and $n_{min}$ the worst column, according to the sorting criterion. Both columns are removed from the codebook and replaced by elements of the codebook belonging to one level higher than column $n_{max}$, and pointing at two directions around which $n_{max}$ was pointing. This operation steers the array in directions that are determined according to the design criterion. At the BS, the beam selection finds a compromise to serve multiple terminals through a common beam according to a multi-terminal design criterion. For the results presented below in FIG. 4, two different criteria were evaluated. One of them (sum of BF gains) simply sorts the columns of the precoder following the sum of signal energies received from all K users. The other criterion (ZF sum-rate) evaluates the contribution of each precoder column to the achievable sum-rate that the system would obtain if the BS used a zero-forcing (ZF) BB precoder; the columns are then sorted in descending order of contribution to the system's estimated sum-rate. Note that other criteria for the selection of the BS RF precoder columns may be used as well, depending on the transmission strategy for the BS.

As each terminal possesses its own RF precoder, at the user side the beams can be selected according to a simple received signal energy criterion described in the routine UPD.UE ANALOG PRECODER in Algorithm 2. Generally speaking, the beams are steered along directions over which most signal is received with beams that have increasing directivity as the iterations of the method progress.

The characteristic of the presented method lies in the inclusion of the RF precoder updates into the sequence of alternate transmissions in a communication between a BS and multiple terminals. The described update of the RF precoders enables the use of the method with hybrid digital-analog antenna arrays for a multi-terminal communication system.

The above description presents the method in its simplest form. In this way, it can be used for acquisition of beamformer before the transceivers start exchanging data. While only pilot transmissions are considered here, the method can be used in other contexts. The basic requirement is simply that approximate reciprocity of the channel is kept, and that the channel matrix does not vary too fast.

Other possible implementations of the method include:
Schemes in which data transmissions are included in between the pilot transmissions.
Implementations in a data-aided manner are also possible after the first few iterations (once the effective SNR at reception is large enough to successfully detect data symbols).

For slowly changing channels, the method can be used to track the channel variations over time.

For channels with faster variations, implementations in which a fallback option to low-level RF precoders when signal energy decreases is enabled can provide protection against blockage, deep fades, etc.

Figure 4:
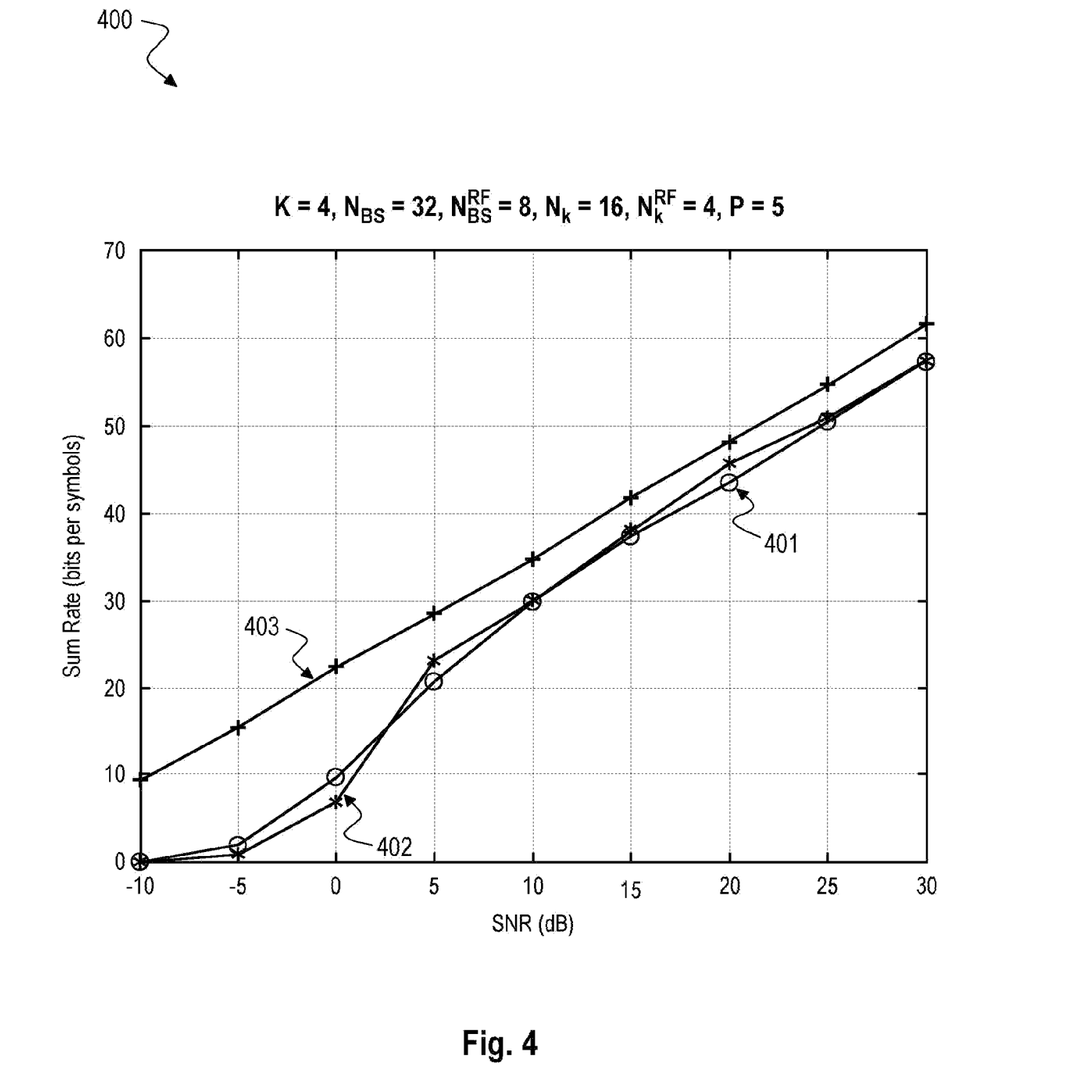
FIG. 4 is a performance diagram 400 illustrating exemplary performance of multi-user beamforming 401, 402 according to the disclosure versus a system with perfect channel state information 403.

FIG. 4 is a performance diagram 400 illustrating exemplary performance of multi-user beamforming 401, 402 according to the disclosure versus a system with perfect channel state information 403.

The performance of the disclosed method (Multi-Terminal Hybrid PPBT) can be shown by evaluating the multi-terminal sum rate at each iteration of the training procedure. An iteration comprises one transmission/reception of either the access point 210 or the multiple terminals 220, 330. The benchmark is provided against the sum rate obtained in a system using ZF transceivers with perfect CSI 403 and fully digital antenna arrays which uses fully digital arrays.

A system with one BS (indexed as BS) and K terminals (indexed by k) is considered. All devices are equipped with uniform linear arrays with $N_{BS}$ and $N_k$ elements separated by a distance $d=\lambda/2$, each of them having $N_{BS}^{RF}$ and $N_k^{RF}$ RF chains, and with $\lambda$ denoting the wavelength.

Random realizations of the MIMO channel matrix of each terminal are drawn according to the model $$H_k = \sqrt{\frac{N_{BS}N_k}{P}} \sum_{p=1}^{P} \alpha_{k,p} a_k(\Omega_{k,p}) a_{BS}^H(\Omega_{BS,k,p}),$$

where $H_k$ is the downlink channel from the access point to terminal k, P is the number of multipath components (as a simplification, this quantity is assumed to be the same for all terminals), $\alpha_{k,p}$ is the complex gain of the pth component of terminal k, $a_{BS}(\Omega_{BS,k,p}) = [1 \ e^{-j\Omega_{BS,k,p}} \ldots e^{-j(N_{BS}-1)\Omega_{BS,k,p}}]^T/\sqrt{N_{BS}}$ the steering vector at BS (similarly for $a_k(\Omega_{k,p})$), $\Omega_{BS,k,p} = 2\pi d \cos \theta_{BS,k,p}/\lambda$ is the directional cosine of the pth component at the BS array and $\theta_{BS,k,p}$ is the incidence direction of the pth component of terminal k at the BS array (analogous definitions apply for $a_k(\Omega_{k,p})$, $\Omega_{k,p}$ and $\theta_{k,p}$). The complex gains $\alpha_{k,p}$ are drawn from a standard, circularly-symmetric complex Gaussian distribution, while the incidence angles $\theta_{BS,k,p}$ and $\theta_{k,p}$ are uniformly distributed in the range $[0,2\pi]$.

The performance for two different system sizes and several SNRs is depicted in FIG. 4. Graph 401 illustrates the disclosed method based on sum BF gains. Graph 402 illustrates the disclosed method based on zero-forcing sum rate. Graph 403 illustrates a reference system with perfect CSI and digital ZF.

Figure 5:
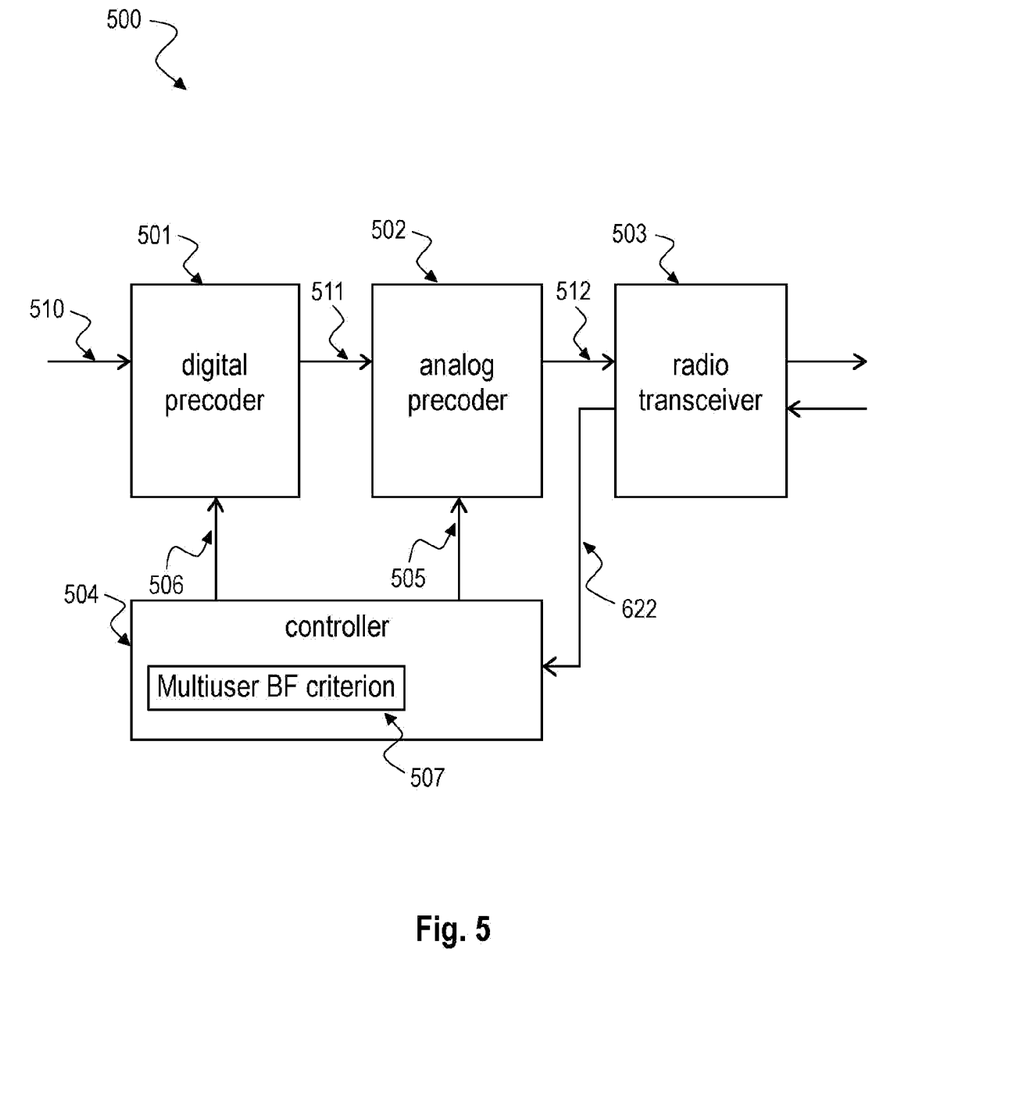
FIG. 5 is a block diagram illustrating an exemplary base station 500 for serving multiple user terminals according to the disclosure.

FIG. 5 is a block diagram illustrating a base station 500 for serving multiple user terminals according to the disclosure. The base station 500 is an exemplary representation of the base station 210 or access point described above with respect to FIGS. 2 and 3 or of the base station or access point 110 described above with respect to FIG. 1.

The base station 500 can serve (i.e. communicate with) multiple user terminals, e.g. user terminals 600 as described below with respect to FIG. 6. The base station 500 includes a digital precoder 501 and an analog precoder 502 which are configured to precode a first training signal 510. The digital precoder 501 may correspond to the baseband precoder 211 described above with respect to FIG. 2. The analog precoder 502 may correspond to the RF precoder 213 described above with respect to FIG. 2. The base station 500 further includes a radio transceiver 503 configured to transmit the precoded first training signal 512 and to receive a precoded second training signal 622 upon transmission of the precoded first training signal 512. The precoded second training signal 622 may be received from a user terminal 600 as described below with respect to FIG. 6. The radio transceiver 503 may correspond to the antenna array 214 or the antenna ports of the antenna array 214 described above with respect to FIG. 2.

The base station 500 further includes a controller 504 configured to adjust 506 a precoding of the digital precoder 501 based on processing of the second training signal 622 with respect to a normalization criterion, e.g. as described above with respect to FIGS. 2 and 3. The controller 504 is further configured to adjust 505 a precoding of the analog precoder 502 based on processing of the second training signal 622 with respect to a multi-user beamforming criterion 507, e.g. as described above with respect to FIGS. 2 and 3.

The controller 504 may adjust 505 the precoding of the analog precoder 502 based on a codebook selection according to the multi-user beamforming criterion, e.g. as described above with respect to FIGS. 2 and 3. The controller 504 may adjust 505 the precoding of the analog precoder 502 based on beam steering according to the multi-user beamforming criterion. The beam steering may be based on directions of departure of most-significant multipath components transmitted by the transceiver, e.g. as described above with respect to FIGS. 2 and 3. The beam steering may be based on selecting beams according to a signal energy criterion.

The multi-user beamforming criterion 507 may include sum of beamforming gains and/or Zero-Forcing (ZF) sum-rate, for example, or other criteria.

The multi-user beamforming criterion 507 may be based on a plurality of analog beams transmitted by the radio transceiver 503 to the multiple user terminals.

The controller 504 may adjust 506 the precoding of the digital precoder 501 based on a ping-pong process with respect to transmissions and receptions of the radio transceiver 503, e.g. as described above with respect to FIGS. 2 and 3. The radio transceiver 503 may transmit a respective transmission based on an adjustment of the digital precoder 501 with respect to a preceding reception, e.g. as described above with respect to FIG. 3.

The controller 504 may adjust 506 the precoding of the digital precoder 501 based on conjugation and normalization of the second training signal, e.g. as described above with respect to FIGS. 2 and 3. The normalization may comprise correlation with a known pilot signal.

The controller 504 may initialize the analog precoder 502 to a state that enables the analog precoder 502 scanning all directions, e.g. as described above with respect to FIGS. 2 and 3. The controller 504 may for example initialize the digital precoder 501 randomly.

The second training signal 622 may comprise respective transmissions from multiple user terminals. These respective transmissions may comprise mutually orthogonal pilot sequences, e.g. as described above with respect to FIGS. 2 and 3.

Figure 6:
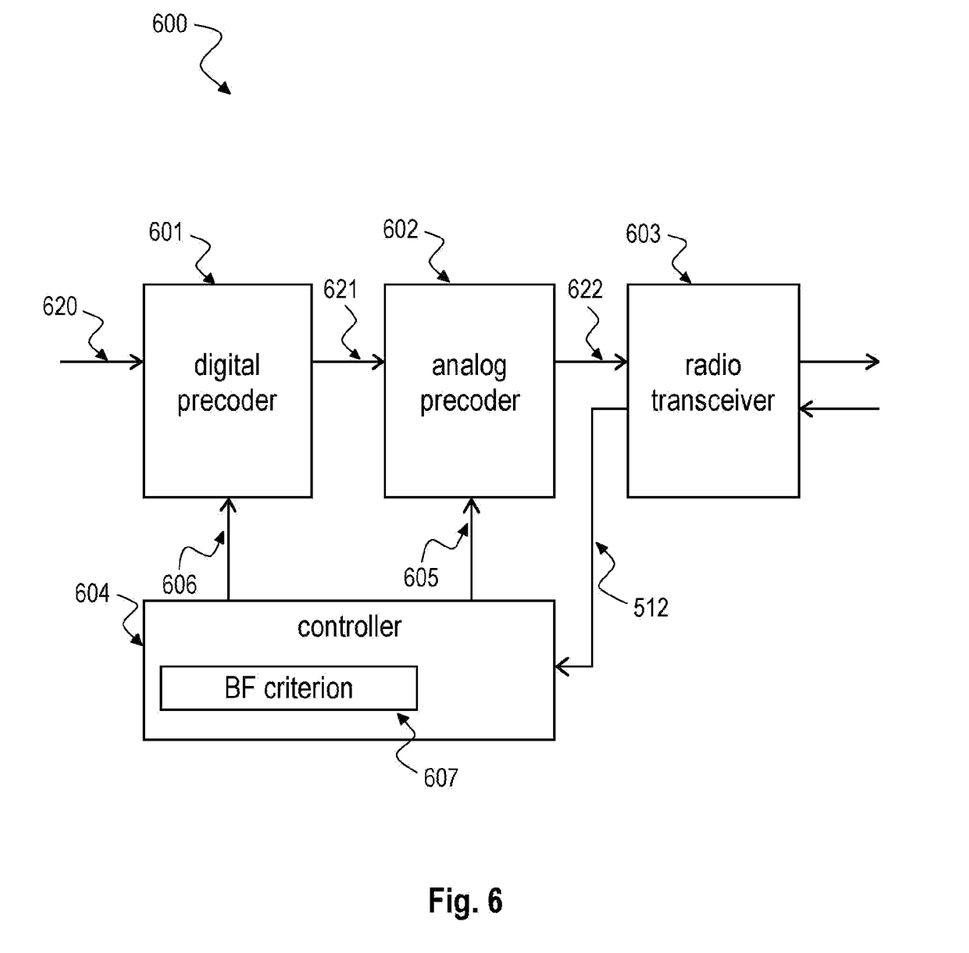
FIG. 6 is a block diagram illustrating an exemplary user terminal 600 according to the disclosure.

FIG. 6 is a block diagram illustrating a user terminal 600 according to the disclosure. The user terminal 600 is an exemplary representation of the user terminals 220, 330 described above with respect to FIGS. 2 and 3 or of the user terminals 121, 122 described above with respect to FIG. 1.

The user terminal 600 includes a digital precoder 601 and an analog precoder 602 which are configured to precode a second training signal 620. The digital precoder 601 may correspond to the baseband combiner 221 or baseband precoder described above with respect to FIG. 2. The analog precoder 602 may correspond to the RF combiner 223 or RF precoder described above with respect to FIG. 2.

The user terminal 600 includes a radio transceiver 603 configured to transmit the precoded second training signal 622 and to receive a precoded first training signal 512 in response to transmission of the precoded second training signal 622. The precoded first training signal 512 may be received from a base station 500 described above with respect to FIG. 5. The radio transceiver 603 may correspond to the antenna array 224 or the antenna ports of the antenna array 224 described above with respect to FIG. 2.

The user terminal 600 further includes a controller 607 configured to adjust 606 a precoding of the digital precoder 601 based on processing of the first training signal 512 with respect to a normalization criterion, e.g. as described above with respect to FIGS. 2 and 3. The controller 607 is configured to adjust 605 a precoding of the analog precoder 602 based on processing of the first training signal 512 with respect to a beamforming criterion 607, e.g. as described above with respect to FIGS. 2 and 3.

The controller 604 may adjust 605 the precoding of the analog precoder 602 based on a codebook selection according to the beamforming criterion, e.g. as described above with respect to FIGS. 2 and 3. The controller 604 may adjust 605 the precoding of the analog precoder 602 based on beam steering of the first training signal 512. The beam steering may be based on directions of departure of most-significant multipath components transmitted by the transceiver 603, e.g. as described above with respect to FIGS. 2 and 3. The beam steering may be based on selecting beams according to a signal energy criterion.

The controller 604 may adjust 606 the precoding of the digital precoder 601 based on a ping-pong process with respect to transmissions and receptions of the radio transceiver 603, e.g. as described above with respect to FIGS. 2 and 3. The radio transceiver 603 may transmit a respective transmission based on an adjustment 606 of the digital precoder 601 with respect to a preceding reception, e.g. as described above with respect to FIG. 3.

The controller 604 may adjust 606 the precoding of the digital precoder 601 based on conjugation and normalization of the first training signal 512, e.g. as described above with respect to FIGS. 2 and 3. The normalization may comprise correlation with a known pilot signal, e.g. as described above with respect to FIGS. 2 and 3.

The controller 604 may initialize the analog precoder 602 to a state that enables the analog precoder 602 scanning all directions, e.g. as described above with respect to FIGS. 2 and 3. For example, the controller 604 may initialize the digital precoder 601 randomly.

Figure 7:
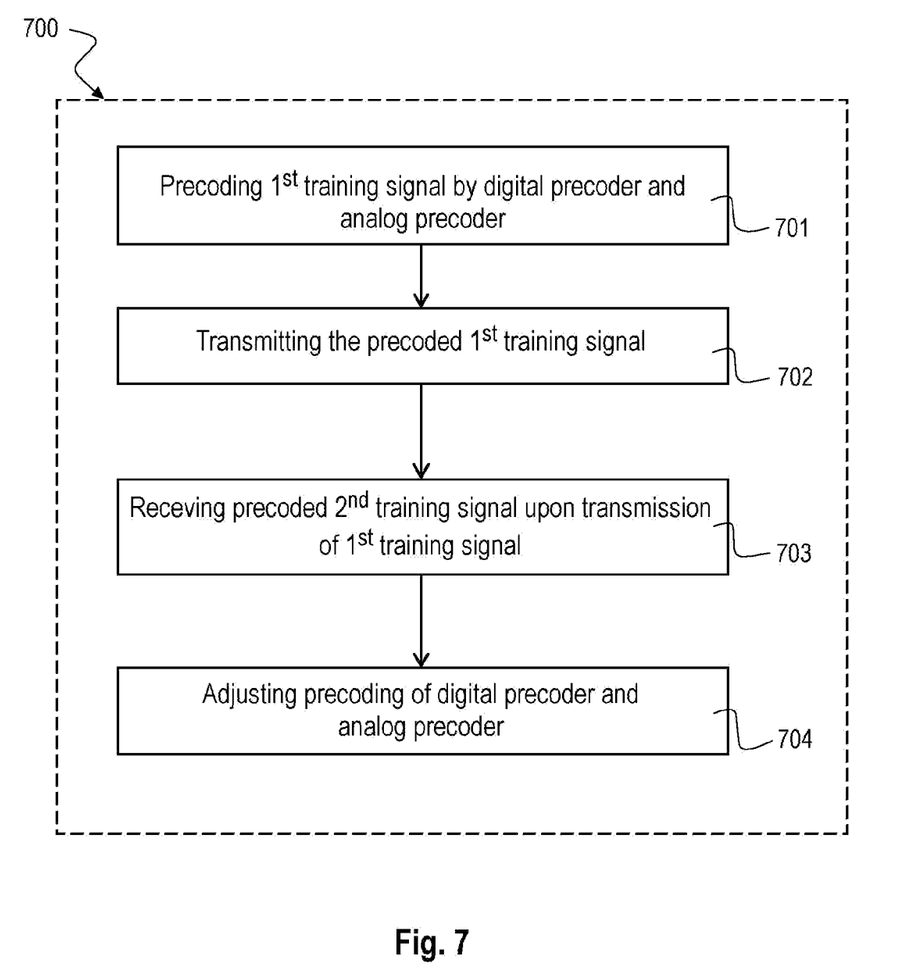
FIG. 7 is a schematic diagram illustrating an exemplary multi-user precoding method 700 according to the disclosure.

FIG. 7 is a schematic diagram illustrating a multi-user precoding method 700 according to the disclosure.

The method 700 includes precoding 701, by a digital precoder and an analog precoder, e.g. a digital precoder 501 and an analog precoder 502 as described above with respect to FIG. 5, a first training signal.

The method 700 includes transmitting 702 the precoded first training signal by a radio transceiver, e.g. a radio transceiver 503 as described above with respect to FIG. 5. The method 700 includes receiving 703 a precoded second training signal by the radio transceiver upon transmission of the precoded first training signal, e.g. as described above with respect to FIGS. 2, 3 and 5.

The method 700 further includes adjusting 704 a precoding of the digital precoder based on processing the second training signal with respect to a normalization criterion and adjusting a precoding of the analog precoder based on processing the second training signal with respect to a multi-user beamforming criterion, e.g. as described above with respect to FIGS. 2, 3 and 5.

The method 700 may further include adjusting the precoding of the analog precoder based on a codebook selection according to the multi-user beamforming criterion, e.g. as described above with respect to FIGS. 2, 3 and 5. The method 700 may further include adjusting the precoding of the analog precoder based on beam steering according to the multi-user beamforming criterion. The beam steering may be based on directions of departure of most-significant multipath components transmitted by the transceiver. The beam steering may be based on selecting beams according to a signal energy criterion. The multi-user beamforming criterion may comprise one of the following: sum of beamforming gains; or Zero-Forcing (ZF) sum-rate. The multi-user beamforming criterion may be based on a plurality of analog beams transmitted by the radio transceiver to the multiple user terminals, e.g. as described above with respect to FIGS. 2, 3 and 5.

The method 700 may further include adjusting the precoding of the digital precoder based on a ping-pong process with respect to transmissions and receptions of the radio transceiver. The method 700 may further include transmitting, by the radio receiver, a respective transmission based on an adjustment of the digital precoder with respect to a preceding reception. The method 700 may further include adjusting the precoding of the digital precoder based on conjugation and normalization of the second training signal, e.g. as described above with respect to FIGS. 2, 3 and 5.

The normalization may comprise correlation with a known pilot signal. The method 700 may further include initializing the analog precoder to a state that enables the analog precoder scanning all directions. The method 700 may further include initializing the digital precoder randomly. The second training signal may comprise respective transmissions from multiple user terminals. The respective transmissions may comprise mutually orthogonal pilot sequences, e.g. as described above with respect to FIGS. 2, 3 and 5.

The devices and systems described in this disclosure may be implemented as Digital Signal Processors (DSP), microcontrollers or any other side-processor or hardware circuit on a chip or an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 300 and 700 described above with respect to FIGS. 3 and 7 and the computing blocks described above with respect to FIGS. 2, 5 and 6. Such a computer program product may include a non-transient readable storage medium storing program code thereon for use by a processor, the program code comprising instructions for performing the methods or the computing blocks as described above.

Examples

The following examples pertain to further embodiments. Example 1 is a base station for communication with multiple user terminals, the base station comprising: a digital precoder and an analog precoder which are configured to precode a first training signal; a radio transceiver configured to transmit the precoded first training signal and to receive a precoded second training signal upon transmission of the precoded first training signal; and a controller configured to adjust a precoding of the digital precoder based on processing of the second training signal with respect to a normalization criterion and to adjust a precoding of the analog precoder based on processing of the second training signal with respect to a multi-user beamforming criterion.

In Example 2, the subject matter of Example 1 can optionally include that the controller is configured to adjust the precoding of the analog precoder based on a codebook selection according to the multi-user beamforming criterion.

In Example 3, the subject matter of any one of Examples 1-2 can optionally include that the controller is configured to adjust the precoding of the analog precoder based on beam steering according to the multi-user beamforming criterion.

In Example 4, the subject matter of Example 3 can optionally include that the beam steering is based on directions of departure of most-significant multipath components transmitted by the transceiver.

In Example 5, the subject matter of Example 4 can optionally include that the beam steering is based on selecting beams according to a signal energy criterion.

In Example 6, the subject matter of any one of Examples 1-5 can optionally include that the multi-user beamforming criterion comprises one of the following: sum of beamforming gains; or Zero-Forcing (ZF) sum-rate.

In Example 7, the subject matter of any one of Examples 1-6 can optionally include that the multi-user beamforming criterion is based on a plurality of analog beams transmitted by the radio transceiver to the multiple user terminals.

In Example 8, the subject matter of any one of Examples 1-7 can optionally include that the controller is configured to adjust the precoding of the digital precoder based on a ping-pong process with respect to transmissions and receptions of the radio transceiver.

In Example 9, the subject matter of Example 8 can optionally include that the radio transceiver is configured to transmit a respective transmission based on an adjustment of the digital precoder with respect to a preceding reception.

In Example 10, the subject matter of any one of Examples 1-9 can optionally include that the controller is configured to adjust the precoding of the digital precoder based on conjugation and normalization of the second training signal.

In Example 11, the subject matter of Example 10 can optionally include that the normalization comprises correlation with a known pilot signal.

In Example 12, the subject matter of any one of Examples 1-11 can optionally include that the controller is configured to initialize the analog precoder to a state that enables the analog precoder scanning all directions.

In Example 13, the subject matter of any one of Examples 1-12 can optionally include that the controller is configured to initialize the digital precoder randomly.

In Example 14, the subject matter of any one of Examples 1-13 can optionally include that the second training signal comprises respective transmissions from multiple user terminals.

In Example 15, the subject matter of Example 14 can optionally include that the respective transmissions comprise mutually orthogonal pilot sequences.

Example 16 is a user terminal, comprising: a digital precoder and an analog precoder which are configured to precode a second training signal; a radio transceiver configured to transmit the precoded second training signal and to receive a precoded first training signal in response to transmission of the precoded second training signal; and a controller configured to adjust a precoding of the digital precoder based on processing of the first training signal with respect to a normalization criterion and to adjust a precoding of the analog precoder based on processing of the first training signal with respect to a beamforming criterion.

In Example 17, the subject matter of Example 16 can optionally include that the controller is configured to adjust the precoding of the analog precoder based on a codebook selection according to the beamforming criterion.

In Example 18, the subject matter of any one of Examples 16-17 can optionally include that the controller is configured to adjust the precoding of the analog precoder based on beam steering of the first training signal.

In Example 19, the subject matter of Example 18 can optionally include that the beam steering is based on directions of departure of most-significant multipath components transmitted by the transceiver.

In Example 20, the subject matter of Example 19 can optionally include that the beam steering is based on selecting beams according to a signal energy criterion.

In Example 21, the subject matter of any one of Examples 16-20 can optionally include that the controller is configured to adjust the precoding of the digital precoder based on a ping-pong process with respect to transmissions and receptions of the radio transceiver.

In Example 22, the subject matter of Example 20 can optionally include that the radio transceiver is configured to transmit a respective transmission based on an adjustment of the digital precoder with respect to a preceding reception.

In Example 23, the subject matter of any one of Examples 16-22 can optionally include that the controller is configured to adjust the precoding of the digital precoder based on conjugation and normalization of the first training signal.

In Example 24, the subject matter of Example 23 can optionally include that the normalization comprises correlation with a known pilot signal.

In Example 25, the subject matter of any one of Examples 16-24 can optionally include that the controller is configured to initialize the analog precoder to a state that enables the analog precoder scanning all directions.

In Example 26, the subject matter of any one of Examples 16-25 can optionally include that the controller is configured to initialize the digital precoder randomly.

Example 27 is a multi-user MIMO system, comprising: a base station according to one of Examples 1 to 15; and a plurality of user terminals according to one of Examples 16 to 26.

Example 28 is a multi-user precoding method, comprising: precoding, by a digital precoder and an analog precoder, a first training signal; transmitting the precoded first training signal by a radio transceiver; receiving a precoded second training signal by the radio transceiver upon transmission of the precoded first training signal; and adjusting a precoding of the digital precoder based on processing the second training signal with respect to a normalization criterion and adjusting a precoding of the analog precoder based on processing the second training signal with respect to a multi-user beamforming criterion.

In Example 29, the subject matter of Example 28 can optionally include adjusting the precoding of the analog precoder based on a codebook selection according to the multi-user beamforming criterion.

In Example 30, the subject matter of any one of Examples 28-29 can optionally include adjusting the precoding of the analog precoder based on beam steering according to the multi-user beamforming criterion.

In Example 31, the subject matter of Example 30 can optionally include that the beam steering is based on directions of departure of most-significant multipath components transmitted by the transceiver.

In Example 32, the subject matter of any one of Examples 30-31 can optionally include that the beam steering is based on selecting beams according to a signal energy criterion.

In Example 33, the subject matter of any one of Examples 28-32 can optionally include that the multi-user beamforming criterion comprises one of the following: sum of beamforming gains; or Zero-Forcing (ZF) sum-rate.

In Example 34, the subject matter of any one of Examples 28-33 can optionally include that the multi-user beamforming criterion is based on a plurality of analog beams transmitted by the radio transceiver to the multiple user terminals.

In Example 35, the subject matter of any one of Examples 28-34 can optionally include adjusting the precoding of the digital precoder based on a ping-pong process with respect to transmissions and receptions of the radio transceiver.

In Example 36, the subject matter of Example 35 can optionally include transmitting, by the radio receiver, a respective transmission based on an adjustment of the digital precoder with respect to a preceding reception.

In Example 37, the subject matter of any one of Examples 28-36 can optionally include adjusting the precoding of the digital precoder based on conjugation and normalization of the second training signal.

In Example 38, the subject matter of Example 37 can optionally include that the normalization comprises correlation with a known pilot signal.

In Example 39, the subject matter of any one of Examples 28-38 can optionally include initializing the analog precoder to a state that enables the analog precoder scanning all directions.

In Example 40, the subject matter of any one of Examples 28-39 can optionally include initializing the digital precoder randomly.

In Example 41, the subject matter of any one of Examples 28-40 can optionally include that the second training signal comprises respective transmissions from multiple user terminals.

In Example 42, the subject matter of Example 41 can optionally include that the respective transmissions comprise mutually orthogonal pilot sequences.

Example 43 is a precoding method, comprising: precoding a second training signal by a digital precoder and an analog precoder; transmitting the precoded second training signal by a radio transceiver; receiving a precoded first training signal by the radio transceiver upon transmission of the precoded second training signal; and adjusting a precoding of the digital precoder based on processing the first training signal with respect to a normalization criterion and adjusting a precoding of the analog precoder based on processing the first training signal with respect to a beamforming criterion.

In Example 44, the subject matter of Example 43 can optionally include adjusting the precoding of the analog precoder based on a codebook selection according to the beamforming criterion.

In Example 45, the subject matter of any one of Examples 43-44 can optionally include adjusting the precoding of the analog precoder based on beam steering of the first training signal.

In Example 46, the subject matter of Example 45 can optionally include that the beam steering is based on directions of departure of most-significant multipath components transmitted by the transceiver.

In Example 47, the subject matter of Example 46 can optionally include that the beam steering is based on selecting beams according to a signal energy criterion.

In Example 48, the subject matter of any one of Examples 43-47 can optionally include adjusting the precoding of the digital precoder based on a ping-pong process with respect to transmissions and receptions of the radio transceiver.

In Example 49, the subject matter of Example 46 can optionally include transmitting, by the radio transceiver, a respective transmission based on an adjustment of the digital precoder with respect to a preceding reception.

In Example 50, the subject matter of any one of Examples 43-49 can optionally include adjusting the precoding of the digital precoder based on conjugation and normalization of the first training signal.

In Example 51, the subject matter of Example 50 can optionally include that the normalization comprises correlation of the first training signal with a known pilot signal.

In Example 52, the subject matter of any one of Examples 43-51 can optionally include initializing the analog precoder to a state that enables the analog precoder scanning all directions.

In Example 53, the subject matter of any one of Examples 43-52 can optionally include initializing the digital precoder randomly.

Example 54 is a multi-user precoding device, comprising: means for precoding a first training signal by a digital precoder and an analog precoder; means for transmitting the precoded first training signal by a radio transceiver; means for receiving a precoded second training signal by the radio transceiver upon transmission of the precoded first training signal; and means for adjusting a precoding of the digital precoder based on processing the second training signal with respect to a normalization criterion and adjusting a precoding of the analog precoder based on processing the second training signal with respect to a multi-user beamforming criterion.

In Example 55, the subject matter of Example 54 can optionally include means for adjusting the precoding of the analog precoder based on a codebook selection according to the multi-user beamforming criterion.

Example 56 is a precoding system for serving multiple user terminals, the precoding system comprising: a digital precoder and an analog precoder component which are configured to precode a first training signal; a radio transceiver component configured to transmit the precoded first training signal and to receive a precoded second training signal upon transmission of the precoded first training signal; and a controller component configured to adjust a precoding of the digital precoder based on processing the second training signal with respect to a normalization criterion and to adjust a precoding of the analog precoder based on processing the second training signal with respect to a multi-user beamforming criterion.

In Example 57, the subject matter of Example 56 can optionally include that the controller component is configured to adjust the precoding of the analog precoder based on a codebook selection according to the multi-user beamforming criterion.

Example 58 is a computer readable non-transitory medium on which computer instructions are stored which, when executed by a computer, cause the computer to perform the method of any one of Examples 28 to 53.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A base station for communication with multiple user terminals, the base station comprising:
   a digital precoder and an analog precoder which are configured to precode a first training signal;
   a radio transceiver configured to transmit the precoded first training signal and to receive a precoded second training signal upon transmission of the precoded first training signal; and
   a controller configured to, after each reception of the second training signal in a ping-pong process including multiple transmissions of first training signals and receptions of second training signals:
      adjust a precoding of the digital precoder based on processing of the second training signal with respect to a normalization criterion;
      cause the radio transceiver to transmit a subsequent first training signal, and
      after transmission of the subsequent first training signal, adjust a precoding of the analog precoder based on processing of the second training signal using a codebook selection according to a multi-user beamforming criterion.

2. The base station of claim 1,
   wherein the controller is configured to adjust the precoding of the analog precoder based on beam steering according to the multi-user beamforming criterion.

3. The base station of claim 2,
   wherein the beam steering is based on directions of departure of most-significant multipath components transmitted by the transceiver.

4. The base station of claim 3,
   wherein the beam steering is based on selecting beams according to a signal energy criterion.

5. The base station of claim 1,
   wherein the multi-user beamforming criterion comprises one of the following: sum of beamforming gains; or Zero-Forcing (ZF) sum-rate.

6. The base station claim 1,
wherein the multi-user beamforming criterion is based on a plurality of analog beams transmitted by the radio transceiver to the multiple user terminals.

7. The base station of claim 1,
wherein the radio transceiver is configured to transmit a respective transmission based on an adjustment of the digital precoder with respect to a preceding reception.

8. The base station of claim 1,
wherein the controller is configured to adjust the precoding of the digital precoder based on conjugation and normalization of the second training signal.

9. The base station of claim 8,
wherein the normalization comprises correlation with a known pilot signal.

10. The base station of claim 1,
wherein the controller is configured to initialize the analog precoder to a state that enables the analog precoder scanning all directions.

11. The base station of claim 1,
wherein the controller is configured to initialize the digital precoder randomly.

12. A user terminal, comprising:
a digital precoder and an analog precoder which are configured to precode a second training signal;
a radio transceiver configured to transmit the precoded second training signal and to receive a precoded first training signal in response to transmission of the precoded second training signal; and
a controller configured to, after each reception of the first training signal in a ping-pong process including multiple transmissions of second training signals and receptions of first training signals:
adjust a precoding of the digital precoder based on processing of the first training signal with respect to a normalization criterion;
cause the radio transceiver to transmit a subsequent second training signal, and
after transmission of the subsequent second training signal, adjust a precoding of the analog precoder based on processing of the first training signal using a codebook selection according to a multi-user beamforming criterion.

13. A multi-user precoding method, comprising:
precoding, by a digital precoder and an analog precoder, a first training signal;
transmitting the precoded first training signal by a radio transceiver;
receiving a precoded second training signal by the radio transceiver upon transmission of the precoded first training signal; and
after each reception of the second training signal in a ping-pong process including multiple transmissions of first training signals and receptions of second training signals:
adjusting a precoding of the digital precoder based on processing the second training signal with respect to a normalization criterion;
transmitting a subsequent first training signal; and
after transmission of the subsequent first training signal, adjusting a precoding of the analog precoder based on processing the second training signal with respect to a multi-user beamforming criterion.

14. A precoding method, comprising:
precoding a second training signal by a digital precoder and an analog precoder;
transmitting the precoded second training signal by a radio transceiver;
receiving a precoded first training signal by the radio transceiver upon transmission of the precoded second training signal; and
after each reception of the first training signal in a ping-pong process including multiple transmissions of second training signals and receptions of first training signals:
adjusting a precoding of the digital precoder based on processing the first training signal with respect to a normalization criterion;
transmitting a subsequent second training signal; and
after transmission of the subsequent second training signal, adjusting a precoding of the analog precoder based on processing the first training signal with respect to a beamforming criterion.

15. A multi-user precoding device, comprising:
means for precoding a first training signal by a digital precoder and an analog precoder;
means for transmitting the precoded first training signal by a radio transceiver;
means for receiving a precoded second training signal by the radio transceiver upon transmission of the precoded first training signal; and
means for adjusting a precoding of the digital precoder based on processing the second training signal with respect to a normalization criterion; causing the means for transmitting to transmit a subsequent first training signal; and, after transmission of the subsequent first training signal, adjusting a precoding of the analog precoder based on processing the second training signal with respect to a multi-user beamforming criterion.

16. A precoding system for serving multiple user terminals, the precoding system comprising:
a digital precoder and an analog precoder component which are configured to precode a first training signal;
a radio transceiver component configured to transmit the precoded first training signal and to receive a precoded second training signal upon transmission of the precoded first training signal; and
a controller component configured to, after each reception of the second training signal in a ping-pong process including multiple transmissions of first training signals and receptions of second training signals:
adjust a precoding of the digital precoder based on processing the second training signal with respect to a normalization criterion;
cause the radio transceiver component to transmit a subsequent first training signal, and
after transmission of the subsequent first training signal, to adjust a precoding of the analog precoder based on processing of the second training signal using a codebook selection according to a multi-user beamforming criterion.

17. A computer readable non-transitory medium on which computer instructions are stored which, when executed by a computer, cause the computer to perform the method of claim 13.

* * * * *